(12) United States Patent
Girard et al.

(10) Patent No.: US 12,270,668 B2
(45) Date of Patent: *Apr. 8, 2025

(54) METHODS FOR RANGE ESTIMATION IN BATTERY POWERED VEHICLES

(71) Applicant: Geotab Inc., Oakville (CA)

(72) Inventors: Mark William Girard, Kitchener (CA); Nadia Sophia Stefopulos, Tiny (CA)

(73) Assignee: Geotab Inc., Oakville (CA)

( * ) Notice: Subject to any disclaimer, the term of this patent is extended or adjusted under 35 U.S.C. 154(b) by 243 days.

This patent is subject to a terminal disclaimer.

(21) Appl. No.: 18/122,471

(22) Filed: Mar. 16, 2023

(65) Prior Publication Data

US 2023/0302957 A1   Sep. 28, 2023

Related U.S. Application Data

(60) Provisional application No. 63/323,210, filed on Mar. 24, 2022.

(51) Int. Cl.
| | | |
|---|---|---|
| *G01C 21/34* | (2006.01) | |
| *B60L 3/12* | (2006.01) | |
| *B60L 7/10* | (2006.01) | |
| *B60L 58/10* | (2019.01) | |
| *B60L 58/12* | (2019.01) | |

(52) U.S. Cl.
CPC ............ *G01C 21/3469* (2013.01); *B60L 3/12* (2013.01); *B60L 7/10* (2013.01); *B60L 58/10* (2019.02); *B60L 58/12* (2019.02); *B60L 2240/12* (2013.01); *B60L 2240/62* (2013.01); *B60L 2240/66* (2013.01); *B60L 2240/662* (2013.01); *B60L 2240/70* (2013.01); *B60L 2250/00* (2013.01)

(58) Field of Classification Search
CPC ..... G01C 21/3469; B60L 58/12; B60L 58/10; B60L 3/12; B60L 7/10; B60L 2240/12; B60L 2240/62; B60L 2240/66; B60L 2240/662; B60L 2240/70; B60L 2250/00
See application file for complete search history.

(56) References Cited

U.S. PATENT DOCUMENTS

| | | |
|---|---|---|
| 6,625,539 B1 | 9/2003 | Kittell |
| 6,826,460 B2 | 11/2004 | Kittell |
| 2012/0179362 A1 | 7/2012 | Stille |
| 2013/0238163 A1 | 9/2013 | Onogi |
| 2015/0298555 A1 | 10/2015 | Bennett et al. |
| 2016/0061610 A1 | 3/2016 | Meyer |
| 2019/0107407 A1 | 4/2019 | Bucsan |
| 2019/0283592 A1 | 9/2019 | Koebler et al. |

(Continued)

OTHER PUBLICATIONS

EESR Search Report dated Sep. 11, 2023.

*Primary Examiner* — Jacob M Amick
(74) *Attorney, Agent, or Firm* — Mark J. Pringle-Rigby

(57) ABSTRACT

Systems, methods, devices, and models for range estimation and analysis in battery powered vehicles are described. Energy consumption over vehicle trips is collected, to evaluate weighting factors for a weighted sum. The weighted sum is evaluated based on determined weighting factors and expected trip data, to determine an energy consumption of a trip or trips of a vehicle. Determined energy consumption for trips is used for evaluating suitability of the vehicle for performing the trips.

16 Claims, 5 Drawing Sheets

(56) References Cited

U.S. PATENT DOCUMENTS

2020/0116516 A1\* 4/2020 Kim .................. B60L 58/10
2021/0018924 A1   1/2021 Szubbocsev
2024/0377210 A1\* 11/2024 Kishita ............. G01C 21/3492

\* cited by examiner

METHODS FOR RANGE ESTIMATION IN BATTERY POWERED VEHICLES

PRIOR APPLICATION DATA

The present patent application claims priority to U.S. Provisional Patent Application No. 63/323,210, filed Mar. 24, 2022, titled "Systems, Methods, Devices, and Models for Range Estimation in Battery-Powered Vehicles".

TECHNICAL FIELD

The present disclosure generally relates to systems, devices, methods, and models for determining range of battery-powered vehicles, and in particular relates to determining range based on energy consumption or efficiency of battery-powered vehicles.

BACKGROUND

Battery-powered vehicles (e.g. all-electric vehicles, hybrid electric vehicles, etc.) are a convenient and environmentally friendly means of transportation. A battery-powered vehicle includes at least one battery, which can be charged from an external power source. A battery-powered vehicle can alternately be called an "electric vehicle". It is desirable to be able to accurately predict a distance a battery-powered vehicle is capable of driving (range). This is especially true in regions where charging infrastructure is limited, such that unexpected or unplanned charging of a battery-powered vehicle can be difficult. Further, even for vehicles with alternate non-battery power sources (e.g. hybrid electric vehicles, plug in hybrid vehicles), it is desirable to be able to accurately predict a range of such vehicles on battery power, for more efficient operation (e.g. by minimization of operation on non-battery power).

SUMMARY

According to a broad aspect, the present disclosure describes a method for estimating energy consumption by a vehicle for a trip by the vehicle, based on trip data representative of the trip, the method comprising: identifying a distance of travel for the trip based on a plurality of geographic positions represented in the trip data; identifying a duration of the trip based on a plurality of timestamps in the trip data; identifying an ambient temperature of an environment of the vehicle for the trip based on temperature data; identifying speed of the vehicle for the trip based on the trip data; determining energy consumption by the vehicle for the trip as a weighted sum of: energy loss due to vehicle friction, based on the identified distance of travel; a total time of the trip, based on the identified total time of the trip; energy loss due to temperature control of the vehicle, based on a difference between the identified ambient temperature of the vehicle and an optimal temperature, for the duration of the trip; and energy loss due to air resistance, based on the identified speed of the vehicle; and outputting the determined energy consumption by the vehicle for the trip.

Identifying the distance of travel may comprise: determining respective distances between sequential geographic positions represented in the trip data; summing each of the determined respective distances.

Identifying a duration of the trip may comprise determining a difference between a first timestamp corresponding to a beginning of the trip and a second timestamp corresponding to an end of the trip.

The temperature data may be separate from the trip data; and identifying an ambient temperature of an environment of the vehicle may comprise identifying, from the temperature data, ambient temperature during the trip for a geographical region corresponding to a geographical region where the trip occurred.

The temperature data may be included in the trip data, and the temperature data may include a plurality of indications of temperature of an environment of the vehicle during the trip; the method may further comprise determining an average ambient temperature of an environment of the vehicle over the trip, by averaging temperature indicated in the plurality of indications of temperature of an environment of the vehicle during the trip; and energy loss due to temperature control of the vehicle may be based on a difference between the determined average ambient temperature and an optimal temperature, for the duration of the trip.

The temperature data may be included in the trip data, and the temperature data may include a plurality of indications of temperature of an environment of the vehicle during the trip; and energy loss due to temperature control of the vehicle may be based on a respective difference between each indication of ambient temperature of the vehicle and an optimal temperature, over the duration of the trip.

Identifying a speed of the vehicle may comprise identifying speed of the vehicle for a plurality of segments of the trip; and energy loss due to air resistance for the trip may be determined as a summation of energy loss due to air resistance for each segment of the trip, based on the identified speed of the vehicle for each segment of the trip. Identifying speed of the vehicle for a plurality of segments of the trip may comprise: identifying each segment of the trip as being between sequential geographic positions indicated in the trip data with corresponding timestamps; and identifying speed of the vehicle for each segment of the trip by determining, for each segment of the trip, distance of the segment as distance between sequential geographic positions corresponding to the respective segment, duration of the segment as difference in time between timestamps corresponding to a beginning of the segment and an end of the segment, and dividing the respective distance by the respective duration for the segment.

The weighted sum may further include energy consumed to impart kinetic energy to the vehicle, based on change in speed of the vehicle during the trip. The weighted sum may further include energy recovered by a regenerative braking system of the vehicle, based on change in speed of the vehicle during the trip.

The method may further comprise: collecting, by a telematic monitoring device positioned at the vehicle, the trip data.

The method may further comprise: simulating the trip by the vehicle; and generating the trip data based on the trip as simulated.

Outputting the determined energy consumption by the vehicle for the trip may comprise presenting the determined energy consumption by the vehicle for the trip to a user of the vehicle by a user interface positioned at the vehicle.

Outputting the determined energy consumption by the vehicle for the trip may comprise presenting the determined energy consumption by the vehicle for the trip to a manager of the vehicle by a vehicle management device external to the vehicle.

According to another broad aspect, the present disclosure describes a system for estimating energy consumption by a vehicle for a trip by the vehicle, based on trip data representative of the trip, the system comprising: at least one processor; and at least one non-transitory processor-readable storage medium communicatively coupled to the at least one processor, the at least one non-transitory processor-readable storage medium storing processor-executable instructions which, when executed by the at least one processor, cause the system to: identify, by the at least one processor, a distance of travel for the trip based on a plurality of geographic positions represented in the trip data; identify, by the at least one processor, a duration of the trip based on a plurality of timestamps in the trip data; identify, by the at least one processor, an ambient temperature of an environment of the vehicle for the trip based on temperature data; identify, by the at least one processor, speed of the vehicle for the trip based on the trip data; determine, by the at least one processor, energy consumption by the vehicle for the trip as a weighted sum of: energy loss due to vehicle friction, based on the identified distance of travel; a total time of the trip, based on the identified total time of the trip; energy loss due to temperature control of the vehicle, based on a difference between the identified ambient temperature of the vehicle and an optimal temperature, for the duration of the trip; and energy loss due to air resistance, based on the identified speed of the vehicle; and output the determined energy consumption by the vehicle for the trip.

The processor-executable instructions which cause the at least one processor to identify the distance of travel may cause the at least one processor to: determine respective distances between sequential geographic positions represented in the trip data; and sum each of the determined respective distances.

The processor-executable instructions which cause the at least one processor to identify a duration of the trip may cause the at least one processor to determine a difference between a first timestamp corresponding to a beginning of the trip and a second timestamp corresponding to an end of the trip.

The temperature data may be separate from the trip data; and the processor-executable instructions which cause the at least one processor to identify an ambient temperature of an environment of the vehicle may cause the at least one processor to identify, from the temperature data, ambient temperature during the trip for a geographical region corresponding to a geographical region where the trip occurred.

The temperature data may be included in the trip data, and the temperature data may include a plurality of indications of temperature of an environment of the vehicle during the trip; the processor-executable instructions may further cause the at least one processor to determine an average ambient temperature of an environment of the vehicle over the trip, by averaging temperature indicated in the plurality of indications of temperature of an environment of the vehicle during the trip; and energy loss due to temperature control of the vehicle may be based on a difference between the determined average ambient temperature and an optimal temperature, for the duration of the trip.

The temperature data may be included in the trip data, and the temperature data may include a plurality of indications of temperature of an environment of the vehicle during the trip; and energy loss due to temperature control of the vehicle is based on a respective difference between each indication of ambient temperature of the vehicle and an optimal temperature, over the duration of the trip.

The processor-executable instructions which cause the at least one processor to identify a speed of the vehicle may cause the at least one processor to identify speed of the vehicle for a plurality of segments of the trip; and energy loss due to air resistance for the trip may be determined as a summation of energy loss due to air resistance for each segment of the trip, based on the identified speed of the vehicle for each segment of the trip. The processor-executable instructions which cause the at least one processor to identify speed of the vehicle for a plurality of segments of the trip may cause the at least one processor to: identify each segment of the trip as being between sequential geographic positions indicated in the trip data with corresponding timestamps; and identify speed of the vehicle for each segment of the trip by determining, for each segment of the trip, distance of the segment as distance between sequential geographic positions corresponding to the respective segment, duration of the segment as difference in time between timestamps corresponding to a beginning of the segment and an end of the segment, and dividing the respective distance by the respective duration for the segment.

The weighted sum may further include energy consumed to impart kinetic energy to the vehicle, based on change in speed of the vehicle during the trip. The weighted sum may further include energy recovered by a regenerative braking system of the vehicle, based on change in speed of the vehicle during the trip.

The system may further comprise a telematic monitoring device positioned at the vehicle, and the processor-executable instructions may further cause the system to collect, by the telematic monitoring device, the trip data.

The processor-executable instructions may further cause the at least one processor to: simulate the trip by the vehicle; and generate the trip data based on the trip as simulated.

The system may further comprise a user interface positioned at the vehicle, and the processor-executable instructions which cause the system to output the determined energy consumption by the vehicle for the trip may cause the user interface to present the determined energy consumption by the vehicle for the trip to a user of the vehicle.

The system may further comprise a management device external to the vehicle, and the processor-executable instructions which cause the system to output the determined energy consumption by the vehicle for the trip may cause the system to present the determined energy consumption by the vehicle for the trip to a manager of the vehicle by the management device.

According to yet another broad aspect, the present disclosure describes a device for estimating energy consumption by a vehicle for a trip by the vehicle, based on trip data representative of the trip, the device comprising: at least one sensor interface for receiving sensor data; at least one processor; and at least one non-transitory processor-readable storage medium communicatively coupled to the at least one processor, the at least one non-transitory processor-readable storage medium storing processor-executable instructions which, when executed by the at least one processor, cause the device to: identify, by the at least one processor, a distance of travel for the trip based on a plurality of geographic positions represented in the trip data; identify, by the at least one processor, a duration of the trip based on a plurality of timestamps in the trip data; identify, by the at least one processor, an ambient temperature of an environment of the vehicle for the trip based on temperature data; identify, by the at least one processor, speed of the vehicle for the trip based on the trip data; determine, by the at least one processor, energy consumption by the vehicle for the trip as a weighted sum of: energy loss due to vehicle friction, based on the identified distance of travel; a total time of the trip, based on the identified total time of the trip; energy loss due to temperature control of the vehicle, based on a difference between the identified ambient temperature of the vehicle and an optimal temperature, for the duration of the trip; and energy loss due to air resistance, based on the identified speed of the vehicle; and output the determined energy consumption by the vehicle for the trip.

The processor-executable instructions which cause the at least one processor to identify the distance of travel may cause the at least one processor to: determine respective distances between sequential geographic positions represented in the trip data; and sum each of the determined respective distances.

The processor-executable instructions which cause the at least one processor to identify a duration of the trip may cause the at least one processor to determine a difference between a first timestamp corresponding to a beginning of the trip and a second timestamp corresponding to an end of the trip.

The temperature data may be separate from the trip data; and the processor-executable instructions which cause the at least one processor to identify an ambient temperature of an environment of the vehicle may cause the at least one processor to identify, from the temperature data, ambient temperature during the trip for a geographical region corresponding to a geographical region where the trip occurred.

The temperature data may be included in the trip data, and the temperature data may include a plurality of indications of temperature of an environment of the vehicle during the trip; the processor-executable instructions may further cause the at least one processor to determine an average ambient temperature of an environment of the vehicle over the trip, by averaging temperature indicated in the plurality of indications of temperature of an environment of the vehicle during the trip; and energy loss due to temperature control of the vehicle may be based on a difference between the determined average ambient temperature and an optimal temperature, for the duration of the trip.

The temperature data may be included in the trip data, and the temperature data may include a plurality of indications of temperature of an environment of the vehicle during the trip; and energy loss due to temperature control of the vehicle may be based on a respective difference between each indication of ambient temperature of the vehicle and an optimal temperature, over the duration of the trip.

The processor-executable instructions which cause the at least one processor to identify a speed of the vehicle may cause the at least one processor to identify speed of the vehicle for a plurality of segments of the trip; and energy loss due to air resistance for the trip may be determined as a summation of energy loss due to air resistance for each segment of the trip, based on the identified speed of the vehicle for each segment of the trip. The processor-executable instructions which cause the at least one processor to identify speed of the vehicle for a plurality of segments of the trip may cause the at least one processor to: identify each segment of the trip as being between sequential geographic positions indicated in the trip data with corresponding timestamps; and identify speed of the vehicle for each segment of the trip by determining, for each segment of the trip, distance of the segment as distance between sequential geographic positions corresponding to the respective segment, duration of the segment as difference in time between timestamps corresponding to a beginning of the segment and an end of the segment, and dividing the respective distance by the respective duration for the segment.

The weighted sum may further include energy consumed to impart kinetic energy to the vehicle, based on change in speed of the vehicle during the trip. The weighted sum may further include energy recovered by a regenerative braking device of the vehicle, based on change in speed of the vehicle during the trip.

The device may comprise a telematic device positioned at the vehicle. The sensor interface may comprise a communication interface to receive the sensor data from at least one sensor external to the telematic device; and the processor-executable instructions may further cause the device to collect, by the telematic device, the trip data including the sensor data from the at least one sensor external to the telematic device. The sensor interface may comprise at least one sensor to capture the sensor data; and the processor-executable instructions may further cause the device to collect, by the telematic monitoring device, the trip data including the sensor data from the at least one sensor. 14. The sensor data may include first sensor data and second sensor data; the sensor interface may comprise a communication interface to receive the first sensor data from at least one sensor external to the telematic monitoring device; the sensor interface may comprise at least one sensor to capture the second sensor data; and the processor-executable instructions may further cause the device to collect, by the telematic monitoring device, the trip data including the first sensor data and the second sensor data.

The processor-executable instructions may further cause the at least one processor to: simulate the trip by the vehicle; and generate the trip data based on the trip as simulated.

The device may further comprise a user interface, and the processor-executable instructions which cause the device to output the determined energy consumption by the vehicle for the trip may cause the user interface to present the determined energy consumption by the vehicle for the trip to a user of the vehicle.

Outputting the determined energy consumption by the vehicle for the trip may comprise outputting the determined energy consumption by the vehicle for the trip to a management device.

BRIEF DESCRIPTION OF THE DRAWINGS

Exemplary non-limiting embodiments are described with reference to the accompanying drawings in which.

DETAILED DESCRIPTION

The present disclosure details systems, devices, methods, and models for analyzing range of battery-powered vehicles.

Figure 1:
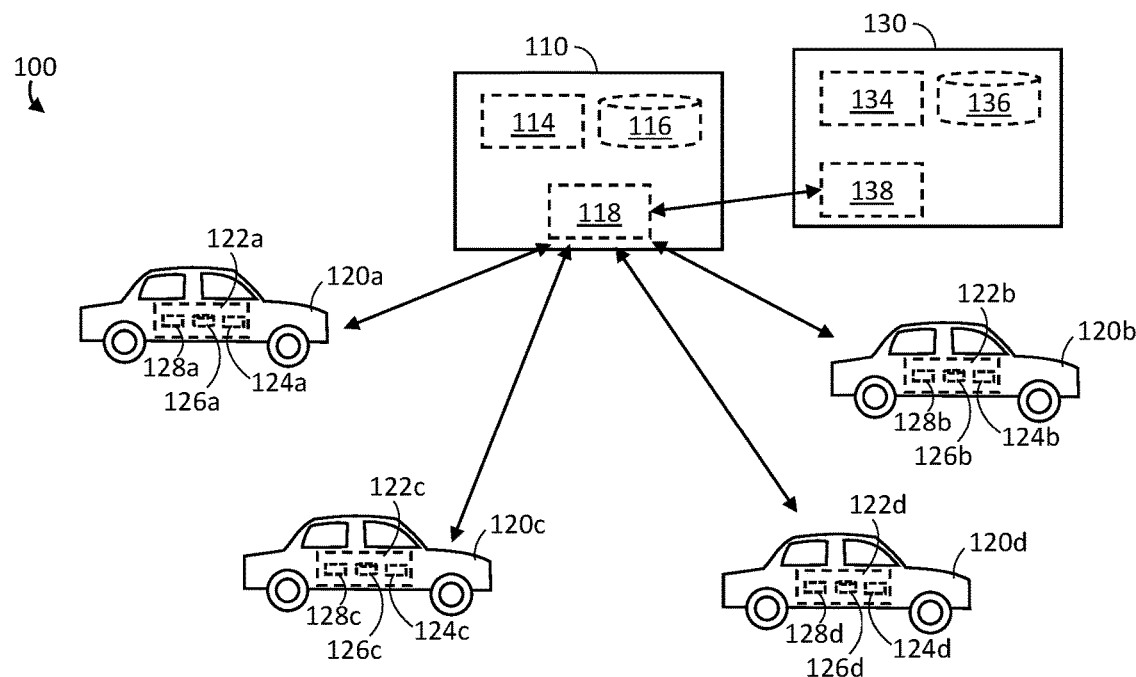
FIG. 1 is a schematic view of a system for managing data for a plurality of vehicles.

FIG. 1 is a schematic view of a system 100 for managing data for a plurality of vehicles. FIG. 1 shows a management device 110, which includes at least one processor 114, at least one non-transitory processor-readable storage medium 116, and a communication interface 118. Although illustrated as one device, management device 110 can include a plurality of devices, a plurality of processors 114, a plurality of non-transitory processor-readable storage mediums 116, and/or a plurality of communication interfaces 118. Further, such a plurality of management devices can be in close proximity (e.g. in a central server location), or can be distributed across different locations (e.g. as remote devices). Communication interface 118 can be a wired or wireless interface, through which management device 110 communicates with other devices, such as a plurality of vehicles, vehicle devices, or user devices.

In the illustrated example, management device 110 is shown as communicating with vehicle devices in four vehicles 120a, 120b, 120c, and 120d (collectively referred to as vehicles 120). However, management device 110 could communicate with vehicle devices in any appropriate number of vehicles, such as one vehicle, dozens of vehicles, hundreds of vehicles, thousands of vehicles, or even more vehicles. In some exemplary implementations, management device 110 is a telematics server, which collects and stores telematics data for a fleet of vehicles. In other exemplary implementations, management device 110 is a location-specific device, which manages vehicles for a particular location (or vehicles for a plurality of locations). In any of these examples, management device 110 can be used to monitor state of charge of batteries for vehicles, and thus can be used to prioritize charging of certain vehicles that need it most (e.g. because charge level is low, and/or is insufficient for an upcoming trip). In some implementations such prioritization of charging is performed on a per-location basis, to assist drivers and/or jockeys to couple vehicles to charge stations as appropriate to optimize charging of the fleet, as discussed in more detail later.

Vehicle 120a includes at least one processor 124a, at least one non-transitory processor-readable storage medium 126a, and a communication interface 128a. Together, the at least one processor 124a, the at least one non-transitory processor-readable storage medium 126a, and the communication interface 128a can be referred to as "vehicle device" 122a.

Vehicle 120b includes at least one processor 124b, at least one non-transitory processor-readable storage medium 126b, and a communication interface 128b. Together, the at least one processor 124b, the at least one non-transitory processor-readable storage medium 126b, and the communication interface 128b can be referred to as "vehicle device" 122b.

Vehicle 120c includes at least one processor 124c, at least one non-transitory processor-readable storage medium 126c, and a communication interface 128c. Together, the at least one processor 124c, the at least one non-transitory processor-readable storage medium 126c, and the communication interface 128c can be referred to as "vehicle device" 122c.

Vehicle 120d includes at least one processor 124d, at least one non-transitory processor-readable storage medium 126d, and a communication interface 128d. Together, the at least one processor 124d, the at least one non-transitory processor-readable storage medium 126d, and the communication interface 128d can be referred to as "vehicle device" 122d.

Collectively, vehicle 120a, vehicle 120b, vehicle 120c, and vehicle 120d can be referred to as "vehicles 120". Collectively, the at least one processor 124a, the at least one processor 124b, the at least one processor 124c, and the at least one processor 124d can be referred to as "processors 124".

Collectively, the at least one non-transitory processor-readable storage medium 126a, the at least one non-transitory processor-readable storage medium 126b, the at least one non-transitory processor-readable storage medium 126c, and the at least one non-transitory processor-readable storage medium 126d can be referred to as "non-transitory processor-readable storage mediums 126". Collectively, communication interface 128a, communication interface 128b, communication interface 128c, and communication interface 128d can be referred to as "communication interfaces 128". Collectively, vehicle device 122a, vehicle device 122b, vehicle device 122c, and vehicle device 122d can be referred to as "vehicle devices 122".

Any of the communication interfaces 128 can be a wired interface or a wireless interface, or a vehicle device can include both a wired communication interface and a wireless communication interface.

Each of vehicle devices 122 can be a monolithically packaged device (i.e. a device contained in a single housing) which is installed in a respective vehicle. For example, any of vehicle devices 122 could be a telematics device, which plugs into the respective vehicle (e.g. at the OBDII port). Such telematics devices can gather vehicle information from the vehicle, from sensors built into the telematics device itself, and communicate said information to management devices such as management device 110. However, this is not necessarily the case, and each vehicle device 122 can refer to the collection of components installed in a vehicle (i.e. they do not have to be packaged in a single housing). As an example, a vehicle manufacturer could install processing, storage, and communication equipment in vehicles for the purpose of collecting, processing, and transmitting data. Further, components of any of the vehicle devices 122 can be multi-purpose components which serve other functions within the vehicle.

FIG. 1 also shows an optional device 130, which includes at least one processor 134, at least one non-transitory processor-readable storage medium 136, and a communication interface 138. Although illustrated as one device, device 130 can include a plurality of devices, a plurality of processors 134, a plurality of non-transitory processor-readable storage mediums 136, and/or a plurality of communication interfaces 138. Further, such a plurality of devices can be in close proximity (e.g. in a central server location), or can be distributed across different locations (e.g. as remote devices). Communication interface 138 can be a wired or wireless interface, through which device 130 communicates with other devices.

In the illustrated example, device 130 communicates with management device 110 via communication interfaces 118 and 138. Such communication can be direct or indirect (e.g. over the internet or any other network). Device 130 can perform processing and provide data to management device 110, which management device 110 in turn uses to manage at least one fleet or group of vehicles (e.g. vehicles 120). As an example, management device 110 may be owned by one entity, which manages a fleet of vehicles. Device 130 may belong to another entity, which provides services to many fleets of vehicles. As a result, device 130 may have access to more vehicle data (i.e. data from a larger quantity of vehicles) compared to management device 110. In an exemplary use case, device 130 may generate range metrics, models, or profiles as discussed in detail later for at least one plurality of vehicles, based on a large amount of vehicle data available to device 130. In this exemplary use case, device 130 communicates such metrics, models, or profiles to management device 110, which management device 110 then uses to perform analysis, assessment, or prediction for similar vehicles in a fleet managed by management device 110 (e.g. vehicles 120). In this way, management device 110 can assess models for vehicles based on a large amount of statistical data that management device 110 itself does not have access to. As another example, management device 110 may be a management device for a specific location (e.g. vehicle lot, warehouse, or hub), such that management device 110 manages vehicles which operate out of said location. In such an example, device 130 may be a fleet management device, which manages vehicles in a fleet across multiple locations (e.g. all locations, or a subset of locations).

Figure 2:
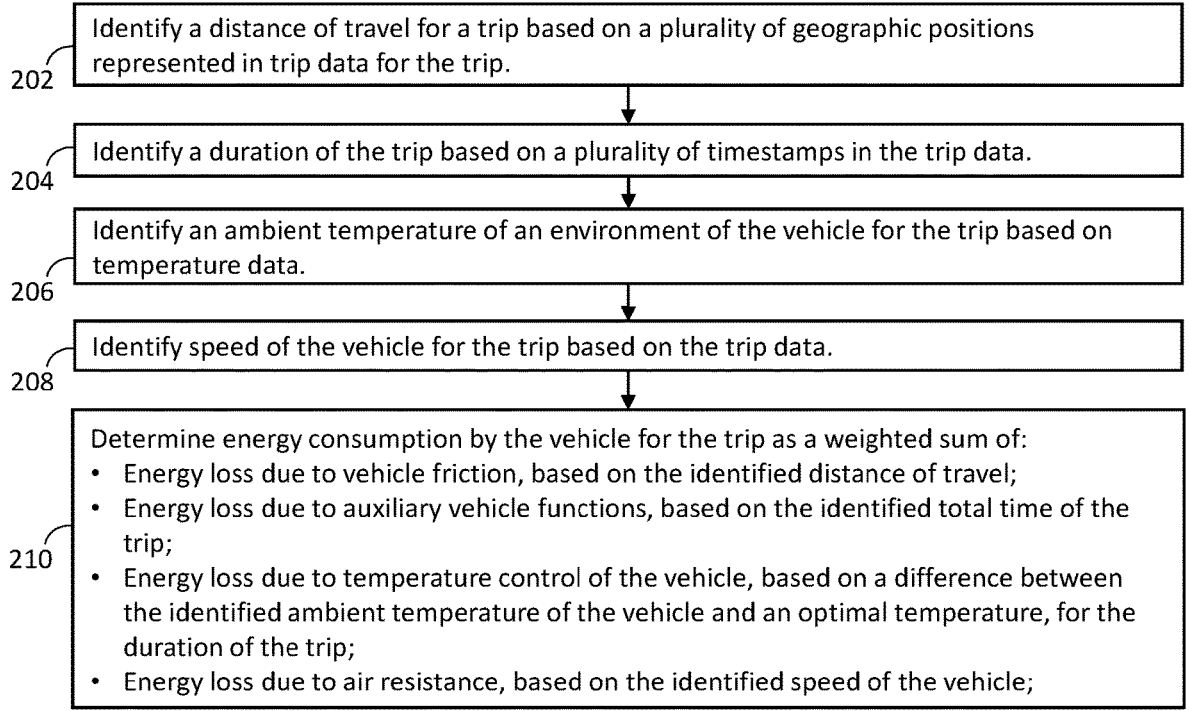
FIG. 2 is a flowchart diagram which illustrates an exemplary method for determining energy loss or consumption for a vehicle trip.

FIG. 2 is a flowchart diagram which illustrates an exemplary method 200 for determining energy loss or consumption by a vehicle for a trip by the vehicle. In some cases, method 200 can be performed after a trip has been travelled by the vehicle, based on trip data for the trip as travelled (e.g. method 200 is performed based on historical trip data). In other cases, method 200 can be performed based on a modeled or simulated trip (i.e. the trip is not actually travelled by the vehicle, or is not yet travelled, but is modeled or simulated such as by route planning or navigation software). Unless context dictates otherwise, discussion of method 200 can pertain to an actual trip as travelled, or a hypothetical (or expected) trip as modeled. Method 200 as illustrated includes acts 202, 204, 206, 208, and 210. One skilled in the art will appreciate that additional acts could be added, acts could be removed, or acts could be reordered as appropriate for a given application. With reference to the example illustrated in FIG. 1, acts can be performed by appropriate components of management device 110, vehicle devices 122, or optional device 130. For example, acts of identification, determination, or summation can be performed by at least one appropriate processor. Further, any of the at least one non-transitory processor-readable storage mediums 116, 126, or 136 could have instructions stored thereon, which when executed by a respective at least one processor (processors 114, 124, or 134) cause the respective management device 110, vehicle device 122, or optional device 130 to perform a given act of method 200. An act being performed by at least one processor 124 refers to the act being performed by any of processors 124a, 124b, 124c, or 124d. An act being performed by at least one non-transitory processor-readable storage medium 126 refers to the act being performed by any of non-transitory processor-readable storage mediums 126a, 126b, 126c, or 126d. An act being performed by communication interface 128 refers to the act being performed by any of communication interfaces 128a, 128b, 128c, or 128d. Typically, for a combination of acts performed by a combination of at least one processor, at least one non-transitory processor-readable storage medium, and a communication interface of a vehicle device, the combination of acts are performed by at least one processor, at least one non-transitory processor-readable storage medium, and a communication interface common to one of vehicle devices 122a, 122b, 122c, or 122d (or any other similar vehicle device). Generally speaking, in the context of method 200 acts of identification and determination are performed by at least one processor (e.g. any of processors 114, 124, or 134). Thus, reference to an act of identifying or determining being performed by a particular device generally refers to the act being performed by at least one processor of the device.

For method 200, trip data for a trip of a vehicle is received. For example, during a trip, any of vehicle devices 122 can capture, sense, or record data for the trip performed by a corresponding vehicle 120. Such captured trip data could include, as non-limiting examples: a plurality of geographic positions of the vehicle during the trip; a plurality of timestamps (e.g. a timestamp associated with each geographic position of the vehicle); temperature data of an environment of the vehicle; speed or velocity data of the vehicle; or any other appropriate data. As another example, for an expected trip (i.e. a trip which has not yet occurred), expected data for the trip can be modeled. Such modeled data could include, as non-limiting examples: a plurality of expected geographic positions of the vehicle during the trip; a plurality of expected timestamps (e.g. a timestamp associated with each geographic position of the vehicle, or expected timestamps at the beginning or end of the trip); temperature data representing expected temperature of an environment of the vehicle; expected speed or velocity data of the vehicle; or any other appropriate data.

In examples where acts 202, 204, 206, 208, and/or 210 are performed by a device other than the vehicle device 122 (such as management device 110 or optional device 130), receiving the trip data can comprise receiving trip data as captured by a vehicle device (similar to as above), over a communication interface (such as communication interfaces 118 and/or 138).

In examples where the trip data is for a simulated trip (as opposed to trip data collected during an actual trip), receiving the trip data can comprise receiving (by at least one processor of any of management device 110, vehicle devices 122, optional device 130, or any other appropriate device) the trip data as generated for the simulated trip. That is, at least one processor of any of management device 110, vehicles device 122, optional device 130, or any other appropriate device can generate simulated trip data as discussed later. This simulated trip data can be stored by at least one non-transitory processor-readable storage medium (e.g. non-transitory processor-readable storage mediums 116, 126, or 136) and accessed by at least one processor performing method 200 as necessary. Alternatively, the simulated trip data can be generated live and used immediately after generation in the context of method 200.

At 202, a distance of travel for the trip is identified based on a plurality of geographic positions represented in the trip data. As one example, a distance could be determined between a first geographic position of the vehicle at a beginning of the trip and a second geographic position of the vehicle at an end of the trip. Such a determined distance is a linear approximation of the trip. However, many trips are non-linear, and as such more accurate distance determining methods could be utilized. In one exemplary implementation, respective distances between sequential geographic positions represented in the trip data can be determined, then each of the determined respective distances can be summed. That is, for a plurality of geographic positions represented in the trip data, a respective distance can be determined between a given geographic position and a sequential geographic position; this can be performed for each geographic position represented in the trip data, such that a plurality of distances are determined which correspond to a piece-wise representation of the trip. These distances can be summed, resulting in a total distance for the trip. In this context, "sequential" geographic positions can be determined based on timestamps associated with each geographic position. Alternatively, "sequential" geographic positions can be determined based on proximity between geographic positions (e.g. a second geographic position can be considered "sequential" to a first geographic position if the second geographic position is spatially the closest geographic position to the first geographic position). Alternatively, "sequential" geographic positions can be determined based on a specified sequence, such as a sequence included in the trip data (e.g., geographic positions can be labelled with sequential index metadata, which specifies a sequence of the geographic positions). Further, though this discussion refers to determining distance between each geographic position in the plurality of geographic positions, it is not necessary that the plurality of geographic positions includes every single piece of geographic position data that may have been captured during the trip or modeled for the trip. In some implementations, some geographic position data may be filtered out from the trip data. For example, suspected erroneous data could be removed (e.g. data which strays unreasonably far from other geographic position data). As another example, redundant geographic position data could be removed to reduce data size (e.g., geographic position data which does not meaningfully further refine representation of the trip, such as intermediate geographic positions along a straight line travelled by the vehicle during the trip). As another example, the trip data may be "compressed" by dropping some data (e.g., even though many geographic positions may be captured or modeled, geographic position may only be reported or included in the trip data at certain intervals).

At 204, a duration of the trip is identified based on a plurality of timestamps in the trip data. For example, a difference in time between a first timestamp and a second timestamp can be determined, where the first timestamp corresponds to a beginning of the trip, and the second timestamp corresponds to an end of the trip. Such a difference in time represents a duration of the trip.

At 206, an ambient temperature of an environment of the vehicle is identified based on temperature data. This could be performed in several different ways.

In a first implementation, the temperature data is separate from the trip data, and identifying an ambient temperature of an environment of the vehicle comprises identifying, from the temperature data, ambient temperature during the trip for a geographical region corresponding to a geographical region where the trip occurred. For example, the temperature data may be received from a weather and temperature monitoring service or entity (e.g. a weather service), and temperature data for the geographical region corresponding to a region where the trip occurred or is modeled as occurring can be identified by cross-referencing geographic position data for the vehicle for the trip with regional temperature information (or temperature prediction information) in the temperature data. For a trip where the vehicle traverses a plurality of regions for which different regional temperature information is available in the temperature data, an appropriate region can be selected in multiple ways discussed below. In one case, temperature data for any one region traversed (or modeled to be traversed) by the vehicle (e.g. a region where the trip begins, a region where the trip ends, or a region therebetween) could be identified as the ambient temperature of an environment of the vehicle for the trip. For greater accuracy, for each region through which the vehicle traverses or is modeled to traverse during the trip, temperature data for the respective region can be identified as the ambient temperature of an environment of the vehicle for a respective segment of the trip. Even if a vehicle is within a particular region during a trip, temperature within the region may change over time during the trip. For a trip where different regional temperature information or predications are available in the temperature data for different times during the trip, an appropriate time period can be selected in multiple ways discussed below. In one case, temperature data for any one time period during the trip (e.g. a beginning of the trip, an end of the trip, or a midpoint of the trip) could be identified as the ambient temperature of an environment of the vehicle during the trip. For greater accuracy, for each time period having different temperature experienced (or expected to be experienced) by the vehicle during the trip, temperature data for the respective time period can be identified as the ambient temperature of an environment of the vehicle for the respective time period of the trip. In determining energy consumption for the trip, temperature for different segments or time periods of the trip can be accounted for in a piece-wise or an integrated manner as is discussed later with reference to Formulas (3) and (4).

In a second implementation, the temperature data is included in the trip data, and the temperature data includes a plurality of indications of temperature of an environment of the vehicle during the trip. For example, the vehicle can be equipped with a temperature sensor which collects temperature data of an environment of the vehicle. This temperature data can be included with other trip data captured by the vehicle. In such an example, the collected temperature data can include a plurality of indications of temperature of an environment of the vehicle during the trip. In some cases, the collected temperature data could be used as-is, as discussed with reference to Formula (4) below. In other cases, from such temperature data, ambient temperature of the vehicle during the trip can be simplified or generalized to reduce processing burden in determining energy consumption for temperature control of the vehicle. In one example, an average ambient temperature of an environment of the vehicle over the trip can be determined, by averaging temperature indicated in the plurality of indications of temperature of an environment of the vehicle during the trip. In another example, a plurality of average ambient temperatures of an environment of the vehicle can be determined, each average temperature in the plurality of ambient temperatures representing a sub-portion of the trip, by averaging temperature indicated in the plurality of indications of temperature of an environment of the vehicle for the respective sub-portion of the trip.

At 208, speed of the vehicle is identified based on the trip data. This can be performed in several ways discussed below.

In a first implementation, speed of the vehicle is identified for a plurality of segments of the trip. For example, for trip data which includes a plurality of geographic positions paired with corresponding timestamps, each segment of the trip can be considered as being between sequential geographic positions. In such a case, distance of the segment is identified as distance between sequential geographic positions corresponding to the segment, and duration of the segment is identified as difference in time between timestamps corresponding to a beginning of the segment and an end of the segment (difference in time between timestamps corresponding to sequential geographic positions). For each segment, distance of the respective segment is divided by respective duration for the segment (that is, distance of the segment is divided by the time it takes the vehicle to travel the segment). In this way, speed of the vehicle for each segment is determined.

In a second implementation, the trip data includes speed data. For example, the vehicle can include a velocity or speed sensor, and speed data or velocity data collected from the velocity or speed sensor can be included in the trip data. As another example, speed data could comprise expected speed during the trip, such as based on speed limits, or based on typical speeds along portions of the trip. Such speed data could be paired with segments of the trip (such as segments delineated by geographic position as discussed above), or could be considered independently.

At 210, energy consumption by the vehicle for the trip is determined as a weighted sum, based on the distance identified in act 202, the duration identified in act 204, the ambient temperature identified in act 206, and the speed identified in act 208. In particular, act 210 involves determining a weighted sum of: energy loss due to vehicle friction, based on the identified distance of travel; energy loss due to auxiliary vehicle functions, based on the identified total time of the trip; energy loss due to temperature control of the vehicle, based on a difference between the identified ambient temperature of the vehicle and an optimal temperature, for the duration of the trip; and energy loss due to air resistance, based on the identified speed of the vehicle. A person of ordinary skill in the art could modify the elements included in the weighted sum as appropriate, including removing elements from the sum, adding elements to the sum, or altering the basis of elements of the sum. As one example, kinetic energy loss due to braking could optionally be included in the sum, as discussed later with reference to Formula (12) and FIGS. 6A and 6B.

The weighted sum in act 210 can be expressed by Formula (1) below:

$$E_{tot} = \alpha_1 D + \alpha_2 T + \alpha_3 \Delta T + \alpha_4 R \tag{1}$$

$E_{tot}$ represents total energy consumed or used (energy loss) from the vehicle battery over the course of the trip. Each of the terms of Formula (1) are discussed in detail below.

The term "$\alpha_1 D$" represents energy loss due to vehicle friction, where $\alpha_1$ is a first weight coefficient, and D is distance travelled over the trip. Vehicle friction in this case refers to friction sources which are relatively unaffected by operator-controllable factors (factors such as velocity or acceleration). Examples include motor friction, axle friction, road friction (friction between tires and road), etc. Vehicle friction is also affected by mass of the vehicle, but in this example mass does not need to be explicitly expressed in Formula (1). Instead, mass is represented within the first weight coefficient $\alpha_1$, since mass is generally specific to a vehicle being modelled by Formula (1) (with some variation for cargo).

The term "$\alpha_2 T$" represents energy loss due to auxiliary vehicle functions, where $\alpha_2$ is a second weight coefficient, and T is duration (time) of the trip. In this model, the rate of energy loss due to auxiliary vehicle functions (e.g. infotainment, lights, etc.) is assumed to be constant over the course of the trip (hence the calculation being a weighted factor multiplied by the duration of the trip. In some implementations however, the term "$\alpha_2 T$" could be multiplied by another factor (or coefficient $\alpha_2$ could be modified) to account for variable auxiliary energy consumption. For example, if the trip takes place at night (or if the trip data includes data indicating that the vehicle lights were on during the trip), the term "$\alpha_2 T$" could be multiplied by a "lights" coefficient, or coefficient $\alpha_2$ could be increased to represent energy consumption by the vehicle lights, so as to more accurately reflect auxiliary energy loss during the trip.

The term "$\alpha_3 \Delta T$" represents energy loss due to temperature control of the vehicle, where $\alpha_3$ is a third weight coefficient, $\Delta$ represents a difference between identified ambient temperature of an environment of the vehicle and an optimal temperature, and T is duration (time) of the trip. $\Delta$ can be represented mathematically as in Formula (2) below:

$$\Delta = |t_{amb} - t_{opt}| \tag{2}$$

$t_{amb}$ represents the identified ambient temperature of an environment of the vehicle, and $t_{opt}$ represents an optimal temperature of the vehicle. The optimal temperature $t_{opt}$ generally corresponds to a temperature which is suitable for human occupation, e.g. 20° C., though optimal temperature could be set as appropriate for a given application. Generally, the greater the difference between ambient temperature of an environment of the vehicle and optimal temperature, the more an operator of the vehicle will use climate control functions of the vehicle (e.g. cabin heating or air conditioning), which results in more energy loss for the trip.

For implementations where ambient temperature of an environment of the vehicle is determined as a single value (e.g. cases where a single ambient temperature for a region is identified, or cases where an average ambient temperature for the trip is determined as discussed above), the term "$\alpha_3 \Delta T$" can be performed as a multiplication as shown in Formula (1).

For implementations where ambient temperature of an environment of the vehicle is determined as a plurality of values (e.g. cases where a plurality of ambient temperatures are identified corresponding to multiple regions of the trip, cases where a plurality of ambient temperatures are identified corresponding to temperatures experienced by (or modeled as being experienced by) the vehicle during different time periods of the trip, or cases where a temperature sensor of the vehicle captures temperature data representing a plurality of temperatures experienced by the vehicle during the trip), the term "$\alpha_3 \Delta T$" can be expanded to account for changing ambient temperature. For example, this term could be expressed according to Formula (3) below:

$$\alpha_3 \Delta T = \alpha_3 \sum_{i=1}^{n} \Delta_i * T_i = \alpha_3 \sum_{i=1}^{n} |t_{amb.i} - t_{opt}| * T_i \tag{3}$$

In Formula (3), for a total number of different temperature segments n (periods of time or regions where ambient temperature different from other periods of time during the trip), respective $\Delta$ for each segment ($\Delta_i$ or $|t_{amb.i} - t_{opt}|$) is multiplied by respective duration for each corresponding segment ($T_i$). The result is summed, and multiplied by the third weight coefficient $\alpha_3$. In this way, energy loss due to climate control is determined in a piece-wise manner (that is, energy loss per temperature segment is calculated on a per segment basis and summed). In some cases, with enough temperature data, $\Delta$ could be modeled as a temperature curve (profile, equation, etc.) over time (temperature as a function of time: $\Delta(t)$). In such cases, integration can be used to evaluate the term "$\alpha_3 \Delta T$" as per Formula (4) below:

$$\alpha_3 \Delta T = \alpha_3 \int_0^T \Delta(t) dt \tag{4}$$

The term "$\alpha_4 R$" in Formula (1) represents energy loss due to air resistance on the vehicle over the trip, where $\alpha_4$ is a fourth weight coefficient, and R is a drag factor representing air resistance. Power to overcome drag due to air resistance is proportional to speed of the vehicle cubed; based on this, energy loss due to air resistance (the term "$\alpha_4 R$") over the trip is represented by Formula (5) below:

$$\alpha_4 R = \alpha_4 \int_0^T v(t)^3 dt \quad (5)$$

In Formula (5), v (t) represents a speed curve (profile, equation, etc.) over time (speed as a function of time). If enough speed data is available, such that vehicle speed over the trip is modelled by a function v (t), Formula (5) can be used directly to determine the term "$\alpha_4 R$" in Formula (1). In some cases, however, speed data may only be available for the trip in segments. In such cases, the term "$\alpha_4 R$" in Formula (1) can be determined in a piece-wise manner in accordance with Formula (6) below:

$$\alpha_4 R = \alpha_4 \sum_{k=1}^{q} v_k{}^3 * T_k = \alpha_4 \sum_{k=1}^{q} v(t_k)^3 * (t_k - t_{k-1}) \quad (6)$$

For a total number of trip segments q, a speed of the vehicle $v_k$ for each segment k is multiplied by a duration of the segment $T_k$. In accordance with a specific implementation, the rightmost representation in Formula (6) shows, for a total number of trip segments q, a speed of the vehicle v at timestamp $t_k$ (a timestamp at an end of segment k) for each segment is multiplied by a duration of the segment $t_k-t_{k-1}$ (where ty represents a timestamp at an end of the segment k, and $t_{k-1}$ represents a timestamp at a beginning of the segment k).

The trip segments in Formula (6) (represented by k and total number q), and the temperature segments in Formula (3) (represented by i and total number n) are not necessarily the same, hence why different labels are used. A trip can be segmented in a different number of temperature segments based on temperature data, temperature change times and regions, and/or data collection times of a temperature sensor. Similarly, a trip can be segmented in a different number of trip segments based on geographic position data, speed data, and/or data collection times of geographic position sensor or speed sensor.

The weight coefficients $\alpha_1$, $\alpha_2$, $\alpha_3$, and $\alpha_4$ can be determined by least squares regression, based on energy consumption data from a plurality of trips. This is shown with reference to FIG. 3 discussed below.

Figure 3:
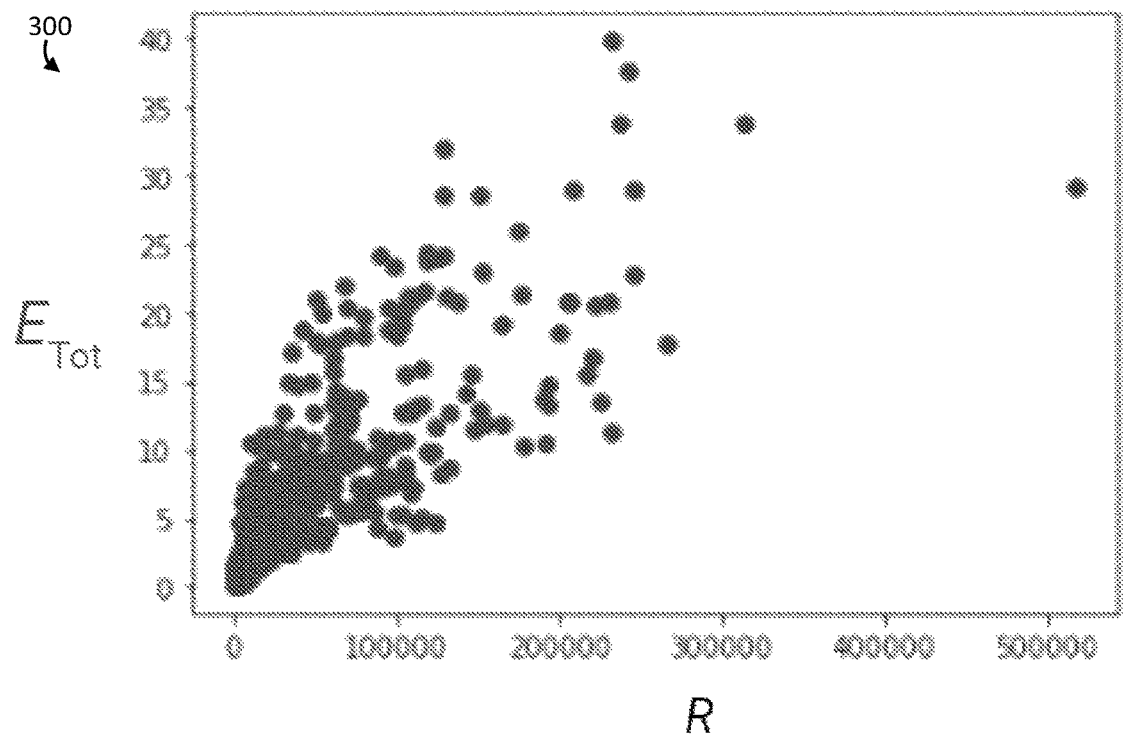
FIG. 3 illustrates a plot which shows energy consumption versus drag resistance factor for a plurality of trips.

FIG. 3 illustrates a plot 300, which shows total energy consumption $E_{tot}$ versus drag resistance factor R discussed above with reference to Formulas (5) and (6). FIG. 3 illustrates trips by a specific vehicle type (make and model), but is not necessarily limited to trips by a single vehicle. In essence, FIG. 3 shows energy consumption by the vehicle proportional to speed (a factor which an operator has significant control over). By performing least squares regression with reference to Formula (1), and filling known data (mass, distance, time, temperature, speed), weighting coefficients $\alpha_1$, $\alpha_2$, $\alpha_3$, and $\alpha_4$ can be determined for the vehicle type. This can be performed similarly for different vehicle types, to arrive at respective representations of energy consumption for the different vehicle types.

Based on the determined $\alpha_1$, $\alpha_2$, $\alpha_3$, and $\alpha_4$, energy consumption for a trip or trips can be determined based on Formula (1). A process for this is discussed below with reference to FIG. 4.

Figure 4:
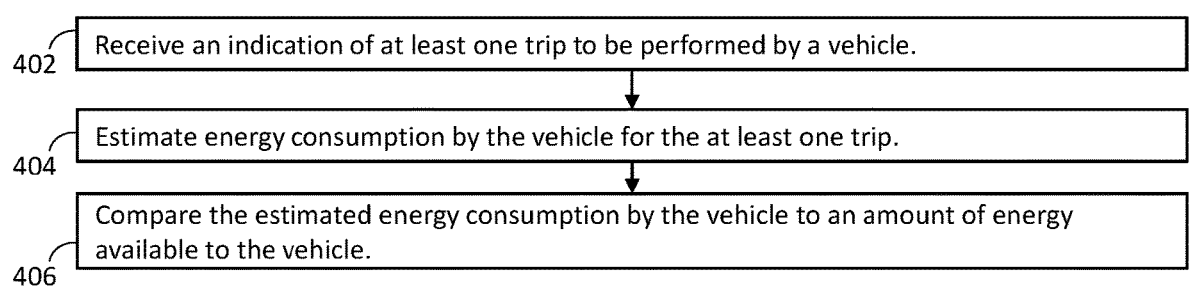
FIG. 4 is a flowchart diagram which illustrates an exemplary method for assessing suitability of a vehicle for a trip.

FIG. 4 is a flowchart diagram which illustrates an exemplary method 400. Method 400 as illustrated includes acts 402, 404, and 406. One skilled in the art will appreciate that additional acts could be added, acts could be removed, or acts could be reordered as appropriate for a given application. With reference to the example illustrated in FIG. 1, acts can be performed by appropriate components of management device 110 or vehicle devices 122. For example, acts of identification, determination, summation, estimation, or comparison can be performed by at least one appropriate processor. Further, any of the at least one non-transitory processor-readable storage mediums 116 or 126 could have instructions stored thereon, which when executed by a respective at least one processor (processors 114 or 124) cause the respective management device 110 or vehicle device 122 to perform a given act of method 400. An act being performed by at least one processor 124 refers to the act being performed by any of processors 124a, 124b, 124c, or 124d. An act being performed by at least one non-transitory processor-readable storage medium 126 refers to the act being performed by any of non-transitory processor-readable storage mediums 126a, 126b, 126c, or 126d. An act being performed by communication interface 128 refers to the act being performed by any of communication interfaces 128a, 128b, 128c, or 128d. Typically, for a combination of acts performed by a combination of at least one processor, at least one non-transitory processor-readable storage medium, and a communication interface of a vehicle device, the combination of acts are performed by at least one processor, at least one non-transitory processor-readable storage medium, and a communication interface common to one of vehicle devices 122a, 122b, 122c, or 122d (or any other similar vehicle device).

At 402, an indication of at least one trip to be performed by a vehicle is received. In a first example, an operator of a vehicle can input a desired destination or route into a route planning system. Other examples are discussed later. The "at least one trip" in act 402 includes a trip to this destination or by this route. In this example, a navigation system of a vehicle having at least one processor is discussed, but in practice any other appropriate device could be utilized, such as a smartphone. In response to an operator inputting a destination, the at least one processor can determine a route to the destination (or the operator can input a route directly).

At 404, based on the route, the at least one processor can evaluate expected energy consumption for a trip to the destination of the route. This can be achieved using Formula (1). The at least one processor can receive or retrieve pertinent data, such as from a non-transitory processor-readable storage medium at the vehicle (e.g. any of non-transitory processor-readable storage mediums 126), or from a remote device such as a server (e.g. management device 110 or device 130). For example, weight coefficients $\alpha_1$, $\alpha_2$, $\alpha_3$, and $\alpha_4$ can be retrieved from a database of information for the specific vehicle being operated (for example stored on at least one non-transitory processor-readable storage medium 126 of a vehicle 120; or stored on at least one non-transitory processor-readable storage medium 116 or 136 remote from the vehicle). Further, the at least one processor can determine expected distance of the trip based on the route. Further, the at least one processor can determine expected duration of the trip, and expected speed profile during the trip, based on the determined distance and based on speed limits and/or typical travel speeds along roadways in the route (e.g. from a database which stores roadway information, for example stored on at least one non-transitory processor-readable storage medium 126 of a vehicle 120; or stored on at least one non-transitory processor-readable storage medium 116 or 136 remote from the vehicle). Further, expected ambient temperature during the trip can be identifying based on temperature data from a temperature provider or database, or based on temperature data collected by a temperature sensor of the vehicle. Based on all of this information, the at least one processor can evaluate Formula (1), to estimate expected energy consumption by the vehicle for the trip.

At 406, the at least one processor compares the estimated energy consumption by the vehicle to an amount of energy available to the vehicle (e.g. charge level or energy capacity of the vehicle battery). Based on the comparison, the at least one processor can determine whether completion of the trip is possible or not. Alternatively, the at least one processor can return a confidence score which indicates how likely it is the vehicle will be able to complete the trip. The at least one processor can also estimate expected energy remaining for the vehicle after the trip (e.g. charge level of the battery after the trip), to provide an operator with the ability to assess travel options after arriving at the destination (e.g. the option to drive to a charge station, or make a return journey).

The method 400 is not limited to being performed for a vehicle which is available (e.g. owned, rented, leased, loaned, or otherwise provided) to an operator. Further, method 400 is also not limited to being performed for a single trip. An exemplary further implementation in this regard is discussed below.

In a second example, a vehicle operator may consider replacing an existing combustion engine vehicle with a battery-powered vehicle. Prior to making this decision, however, it is beneficial for the operator to understand the range capabilities of candidate battery-powered vehicles, and particularly whether candidate battery-powered vehicles can suit the needs of the operator. An appropriate device, such as a personal computer or smartphone, could be used to input routes or trips which the operator wishes to be able to travel, in accordance with act 402 of method 400. This could be performed manually by the operator, or could be automated. In some cases, trip data for previous routes may be accessible. For example, the operator's present vehicle can be equipped with telematics capabilities (e.g. a telematics monitoring device), which can collect trip data regarding where the vehicle has been driven to and from, speeds of travel, temperature data, braking events, or any other appropriate information. As another example, a navigation system of the operator's present vehicle may have travel history stored, which shows where the vehicle has been driven to. In either case, data which is not available can be determined or retrieved by at least one processor. For example, if speed data is not available, vehicle speed can be determined based on geographic position data and timestamps as discussed above. As another example, if temperature data is not available from the trip data, historical temperature data could be retrieved from a temperature data provider.

Based on data for the desired or historical routes and trips, the at least one processor can evaluate Formula (1) to estimate energy consumption for any pertinent number of trips, in accordance with act 404, for at least one candidate battery-powered vehicle under consideration. In accordance with act 406, the at least one processor can compare the estimated energy consumption to an amount of energy available to the vehicle. The compared energy consumption can be for any number of trips sequentially (i.e., any number of trips on a single battery charge) as appropriate for a given application. If the operator is satisfied with the capabilities of a particular candidate vehicle for their needs, they can proceed to acquire said vehicle.

Additionally, it may be desirable to determine not only whether a candidate vehicle can travel to a desired or historical destination or along a desired or historical route, but also if the candidate vehicle can complete a desired plurality of trips within a specified charging schedule. For example, an operator may wish to know not only whether a candidate vehicle can make it to a desired destination, but also if the candidate vehicle can make it back from desired destination, on a single charge.

In a third example, a fleet manager may be evaluating whether to replace a fleet of existing combustion engine vehicles with battery-powered vehicles. To minimize disruption to existing business operations, the fleet manager may be interested in determining if a candidate vehicle (or set of candidate vehicles) will be able to complete a plurality of trips within an existing or non-disruptive energy-replenishment framework. For example, a fleet manager for a delivery company may only be interested in converting to a battery-powered fleet of vehicles if the vehicles can make all expected deliveries in a day on a single charge, with vehicles being returned to a vehicle depot for charging overnight. Such a model would avoid business disruption caused by having to charge battery-powered vehicles mid-day, which can be time-consuming compared to filling a combustion-based engine with fuel.

In this third example, act 402 comprises receiving an indication of at least one trip, performed by a plurality of vehicles. Such indications of trips could be manually provided, or could be retrieved from historical telematics or navigation data, as described above. Trips may be grouped on a per-vehicle basis, in order to determine whether at least one trip corresponding to each vehicle can be performed on a single charge of a battery of a candidate vehicle. That is, for each existing vehicle in the fleet, expected trips to be performed between opportunities to charge are identified or input. This could comprise each trip a vehicle is expected to perform in a day, where the vehicle will be charged overnight. Such identification of trips could be based on the actual trips each individual existing vehicle performs, in order to identify individually whether it would be feasible to replace each individual existing vehicle with a candidate battery-power vehicle. Alternatively, identification of trips could be averaged or approximated to encompass a plurality of vehicles. For example, for a fleet of vehicles where each vehicle in the fleet is expected to perform similarly (i.e. have similar range capabilities), the identified trips could be based on trip data for the plurality of vehicles as a group. Notably, "opportunities to charge" do not necessarily equate to existing times when an existing vehicle refuels. For example, while an existing combustion-engine vehicle may stop for replenishment of combustible fuel, this may not be feasible for recharging a battery of a battery-powered vehicle. As such, opportunities for charging may differ from opportunities for replenishing combustible fuel.

In this third example, act 404 comprises estimating energy consumption by each candidate vehicle, for at least one trip to be performed by each vehicle on a single charge. This can be performed on a per-vehicle basis as discussed above. In some implementations, processing burden can be reduced by first identifying trips or groups of trips between charging opportunities (e.g. in act 402) which are likely to be the most energy consuming. For example, trips or groups of trips of long distance, of long duration, of extreme temperature, or high speed, etc. can be identified.

In this third example, act 406 comprises comparing estimated energy consumption for a trip or group of trips between charging opportunities to an amount of energy available to a candidate vehicle. That is, based on the energy consumption determined for a trip of group of trips to be performed between charging opportunities, the at least one processor determines whether a candidate vehicle has sufficient energy available to perform the trip or group of trips. The most energy consuming group of trips can be selected for comparison for evaluating feasibility of replacing the existing plurality of vehicles, on the grounds that if a candidate vehicle can handle the most energy consuming groups of trips historically, then said candidate vehicle should be able to handle day-to-day operations required of vehicles in the fleet. If a fleet manager has higher risk tolerance, average trip length or trip energy consumption could be identified for comparison with a candidate battery-powered vehicle. In such a scenario, if a candidate vehicle can handle an average day of trips (or an average day plus a safety or excess margin), then the candidate vehicle should generally be able to handle day-to-day operation; though in some cases vehicles may need to be charged midway through a day if energy consumption is particularly high.

Method 400 is not limited to being performed for a single candidate vehicle. In some implementations, a plurality of candidate vehicles can be evaluated, to identify which candidate vehicles of the plurality of candidate vehicles would be capable of completing the identified trips or groups of trips.

In addition or alternative to determining energy consumption for a trip, Formula (1) can be modified to determine instantaneous efficiency for a vehicle. In particular, duration (time) T of a trip can be expressed as in Formula (7) below:

$$T = \frac{D}{v} \quad (7)$$

Further, instantaneous resistance R can be expressed as in Formula (8) below:

$$R = v^3 T = v^3 \frac{D}{v} = v^2 D \quad (8)$$

Efficiency of a vehicle over a trip can be expressed as energy consumed over the trip, divided by the distance of the trip. This is expressed in Formula (9) below:

$$\mathit{Eff} = \frac{E_{tot}}{D} = \alpha_1 + (\alpha_2 + \alpha_3 \Delta)\frac{T}{D} + \alpha_4 \frac{R}{D} \quad (9)$$

Combining Formula (9) with Formulas (7) and (8) results in Formula (10) below:

$$\mathit{Eff} = \alpha_1 + (\alpha_2 + \alpha_3 \Delta)\frac{1}{v} + \alpha_4 v^2 \quad (10)$$

Formula (10) provides a model for efficiency of a vehicle based on speed v and temperature (or specifically difference between ambient temperature of an environment of the vehicle and an optimal temperature, as discussed above with reference to Formula (2)). Formula (1) represents efficiency as energy consumed per distance travelled (e.g. kWh per km travelled), per Formula (9). Formula (10) can be inverted to represent efficiency as distance which can be travelled per unit of energy (e.g. km which can be travelled per kWh). This is shown in Formula (11) below:

$$\mathit{Eff}^{-1} = \frac{1}{\alpha_1 + (\alpha_2 + \alpha_3 \Delta)v^{-1} + \alpha_4 v^2} \quad (11)$$

Figure 5A:
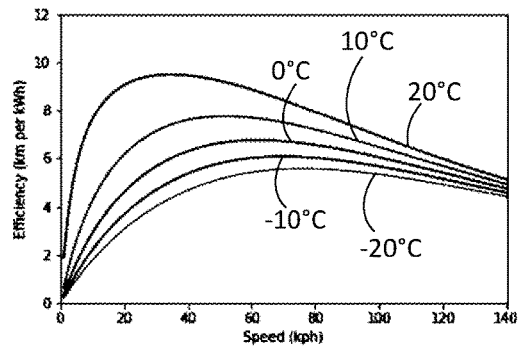
FIGS. 5A, 5B, 5C, and 5D show efficiency curves as a function of speed at a plurality of temperatures, for respective vehicles.
Figure 5B:
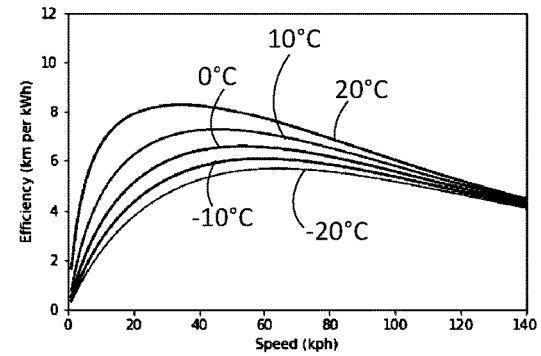
Figure 5C:
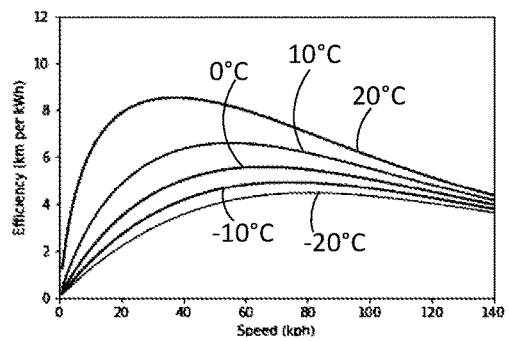
Figure 5D:
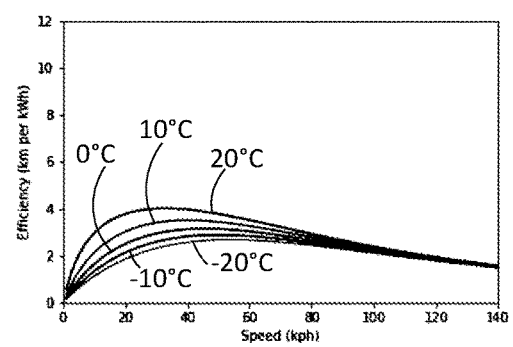

FIGS. 5A, 5B, 5C, and 5D illustrate several exemplary plots which show efficiency (as $\mathit{Eff}^{-1}$) versus speed, at different temperatures, for different vehicles. Specifically, each of FIGS. 5A, 5B, 5C, and 5D illustrate a respective efficiency versus speed curve for a respective vehicle at 20° C., 10° C., 0° C., −10° C., and −20° C. In each of FIGS. 5A, 5B, 5C, and 5D, speed is represented in kph (kilometers per hour), efficiency (as $\mathit{Eff}^{-1}$) is represented in km/kWh (kilometers per kilowatt-hour), and temperature is represented in degrees Celsius. FIGS. 5A, 5B, and 5C illustrate efficiency curves for different small passenger vehicles, whereas FIG. 5D illustrates efficiency curves for a large cargo van. Based on efficiency curves such as the examples illustrated in FIGS. 5A, 5B, 5C, and 5D, an optimum vehicle for a given situation, operator, or fleet can be evaluated, based on expected speeds and temperatures ranges in which the vehicle will be operated. This is useful for assessing viability of acquiring battery-powered vehicles, as an example.

As mentioned above, additional optional terms can be included in Formula (1) (the weighted sum in act 210) for increased accuracy and/or to account for additional factors. One example is expressed in Formula (12) below:

$$E_{tot} = \alpha_1 D + \alpha_2 T + \alpha_3 \Delta T + \alpha_4 R + \alpha_5 K \quad (12)$$

$E_{tot}$ represents total energy consumed or used (energy loss) from the vehicle battery over the course of a trip, similar to as discussed regarding Formula (1) above. Further, the terms "$\alpha_1 D$", "$\alpha_2 T$", "$\alpha_3 \Delta T$", and "$\alpha_4 R$" are as discussed above regarding Formula (1) above.

The term "$\alpha_5 K$" in Formula (12) represents kinetic energy loss of the vehicle during the trip, where as is a fourth weight coefficient, and K is a kinetic energy factor representing kinetic energy losses, and is discussed in detail regarding FIGS. 6A and 6B below. Instantaneous kinetic energy $E_k$ (how much kinetic energy the vehicle has at a given moment) is represented by Formula (13) below:

$$E_k = \frac{mv^2}{2} \quad (13)$$

In Formula (13), m represents mass of the vehicle, and v represents speed of the vehicle. When vehicle brakes are applied (or speed of the vehicle is reduced for any other reason, such as climbing a hill or releasing the accelerator pedal), kinetic energy $E_k$ of the vehicle is reduced. To increase the speed of the vehicle, energy is drawn from the battery to power the vehicle motor. Absent a regenerative braking system, the kinetic energy reduction during speed reduction is lost energy for the trip. With a regenerative braking system, however, a portion of the kinetic energy can be recovered and converted into stored energy in the vehicle battery. Depending on specific vehicle, braking system, severity of braking (how hard the brakes are applied), etc., regenerative braking can recover generally between 30% to 70% of kinetic energy reduced during braking.

Figure 6A:
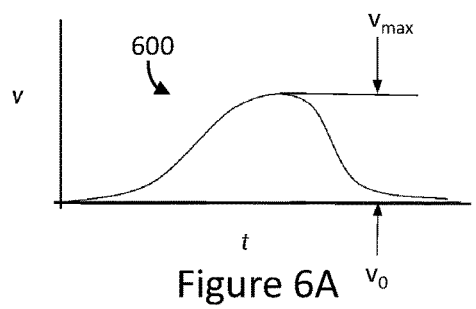
FIGS. 6A and 6B are exemplary plots of speed as a function of time, which illustrate kinetic energy losses of a vehicle.
Figure 6B:
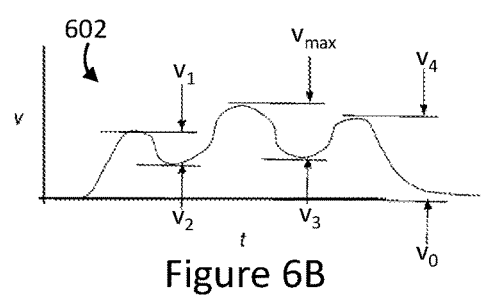

FIGS. 6A and 6B are exemplary plots which show speed (v) as a function of time (t), and illustrate the effect of speed change over a trip on kinetic energy losses. For trip 600 illustrated in FIG. 6A, speed starts at $v_0$, increases to $V_{max}$, and decreases back to $v_0$. Such a trip involves minimal energy loss or consumption due to change in kinetic energy, in that the vehicle only once accelerates up to $V_{max}$, and a significant portion of energy can be recovered by regenerative braking when slowing back down to $v_0$. For trip 602 illustrated in FIG. 6B on the other hand, even though the minimum speed for the trip is $v_0$, and the maximum speed for the trip is $V_{max}$ (the same as trip 600), the vehicle first speeds up to $v_1$, slows down to $v_2$, speeds up again to $V_{max}$, slows down again to $v_3$, speeds up again to $v_4$, and finally slows down to $v_0$. Each time the vehicle speeds up, energy is spent. However, not all of the energy is recovered by regenerative braking when the vehicle slows down. As such, the more the speed of a vehicle increases and decreases during a trip, the more energy is lost (consumed) during the trip. Kinetic energy losses K as in Formula (12) above can be represented as in Formula (14) below:

$$K = E_a - E_b \qquad (14)$$

In Formula (14), Ea represents energy consumed to accelerate, whereas $E_b$ represents energy recovered by regenerative braking. For a vehicle with no regenerative braking, $E_b = 0$, such that Kinetic Energy consumed for the trip is equivalent to Ea (the energy consumed to accelerate). For vehicles with regenerative braking systems, energy recovered by regenerative braking $E_b$ can generally be modelled as a fraction of energy consumed to accelerate Ea, as in Formula (15) below:

$$E_b = f^* E_a \qquad (15)$$

In Formula (15), f represents a proportion of energy which is generally recoverable by a regenerative braking system (the effectiveness of the regenerative braking system in the context of the vehicle). Modifying Formula (14) based on Formula (15) results in Formula (16) below:

$$K = E_a - (f^* E_a) = (1-f)^* E_a \qquad (16)$$

In Formula (12) above, factors that are relatively constant over a trip for the vehicle being modeled can be expressed as a part of the respective weight coefficient. In the case of the term "$\alpha_5 K$", the factor (1-f) can be absorbed into the weight coefficient $\alpha_5$. With this, K can be reduced to just being dependent on $E_\alpha$. Based on Formula (13) above, the energy consumed to accelerate to a speed v is proportional to acceleration $\alpha$ leading up to the speed v. Specifically, by integrating the rate of change of kinetic energy $E_k$, increases and decreases in Kinetic Energy can be summed together to result in total Kinetic Energy change over the trip (which is 0 for a trip where the vehicle starts at rest and ends at rest). To determine energy extracted from the battery to accelerate the vehicle ($E_\alpha$), we can integrate only positive portions the rate of change of kinetic energy $E_k$, as expressed in Formula (17) below:

$$E_a = \int_0^T \left(\frac{dE_k}{dt}\right)^+ dt = \int_0^T ma^+(t) dt \qquad (17)$$

As mentioned above, factors which are relatively constant over a trip for a vehicle being modeled can be expressed as a part of a respective weight coefficient. In the case of Formula (17), mass m can be absorbed into weight coefficient $\alpha_5$. Combining Formulas (16) and (17), and absorbing relatively constant factors into weight coefficient $\alpha_5$ results in Formula (18) below:

$$K = \int_0^T a^+(t) dt \qquad (18)$$

To summarize, the term $\alpha_5 K$ in Formula (12) represents weight coefficient $\alpha_5$ multiplied by an integral of the positive parts of acceleration over a trip. Alternatively, instead of integration of an acceleration curve or function, acceleration could be summed in a piecewise manner, similar to the techniques described above with reference to Formulas (3) and (6). Acceleration data could be collected for example by an acceleration sensor carried by the vehicle, by determining change in velocity based on data from a velocity sensor carried by the vehicle, as non-limiting examples.

Similar to as discussed above with reference to FIG. 3, the weight coefficients $\alpha_1$, $\alpha_2$, $\alpha_3$, $\alpha_4$, and as can be determined by least squares regression, based on energy consumption data from a plurality of trips.

Figure 7:
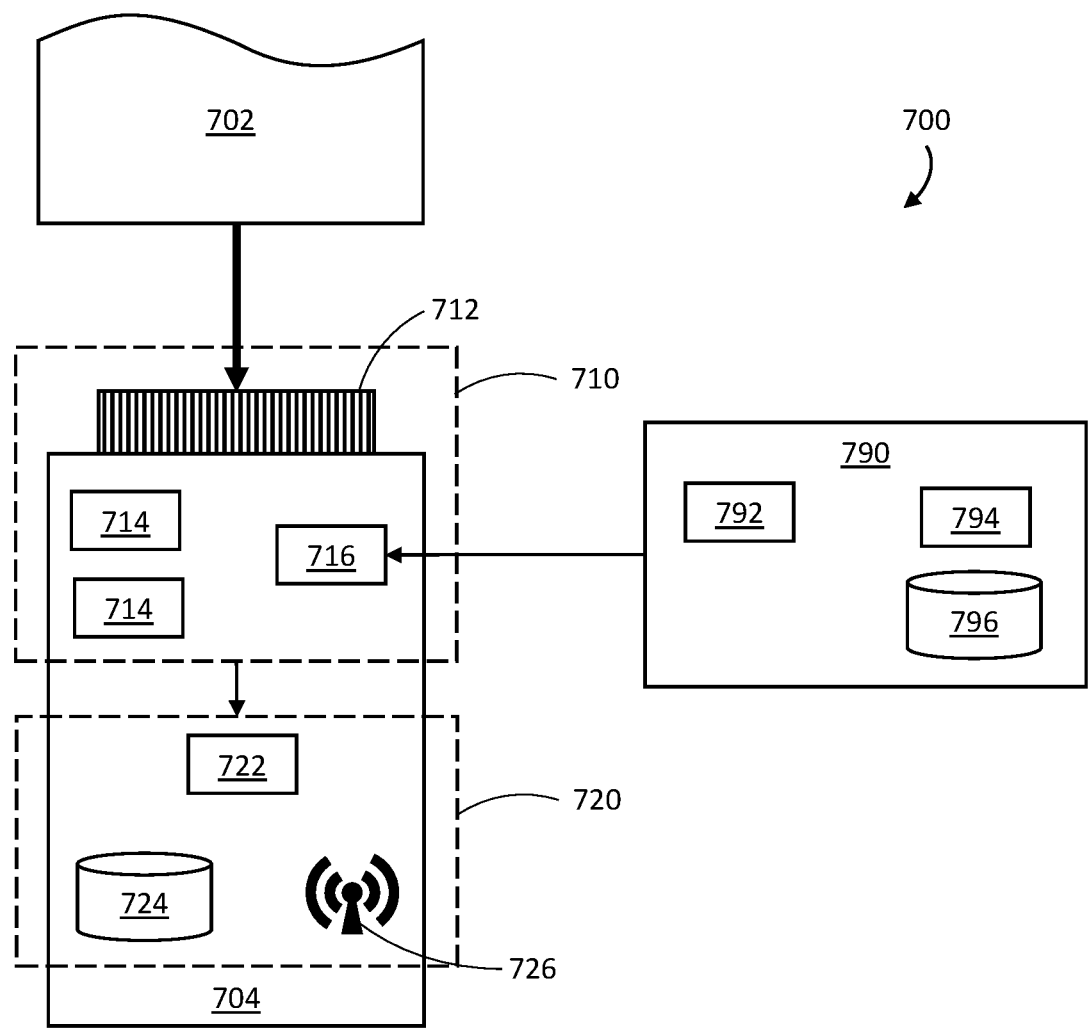
FIG. 7 is a schematic diagram of an exemplary telematic device which couples to a vehicle.

FIG. 7 is a schematic diagram of a system 700, including a telematic device 704 which communicatively couples to a vehicle by a port 702 of the vehicle. Telematic device 704 includes components which are, in the illustration, grouped logically into sensor interface components 710 and control components 720. No physical or spatial grouping of these components is necessary, but rather the grouping discussed herein is a logical delineation for ease of discussion.

Sensor interface 710 is shown as including a communication interface 712 configured to interface with matching port 702 in a vehicle. In an exemplary implementation, port 702 is a diagnostic port (such as an OBDII port) of the vehicle, and communication interface 712 is a matching diagnostic port plug (such as a plug which fits in an OBDII port). Other forms and standards of ports and communication interfaces are possible, as appropriate for a given application. Data from the vehicle (such as sensor data from one or more sensors of the vehicle) is provided to sensor interface 710 of telematic device 704 via port 702 and communication interface 712. Vehicle sensors can include, as non-limiting examples, a speed sensor, an inertial sensor, an RPM sensor, a battery temperature sensor, an ambient temperature sensor, a battery voltage sensor, a battery charge sensor, a location sensor, and any other appropriate sensors which collect vehicle-related data.

Sensor interface 710 is also shown as including at least one sensor 714. In the illustrated example, two sensors 714 are illustrated, but any appropriate number of sensors could be included as appropriate for a given application. Data pertinent to the vehicle can be collected by sensors such as sensor 714. In this way, data can be collected which is not collected by sensors in the vehicle, or is not reported over an accessible port such as port 702. Sensors 714 could include, as non-limiting examples, a speed sensor, an inertial sensor, an ambient temperature sensor, a location sensor, an image sensor (e.g. camera), and any other appropriate sensors which collect vehicle-related data.

Sensor interface 710 is also shown as including a communication interface 716, which communicates with a peripheral device 790. Peripheral device 790 includes at least one sensor 792, and can provide data collected by the at least one sensor 792 to telematics device 704 via communication interface 716. In this way, data can be collected which is not collected by sensors in the vehicle, is not reported over an accessible port such as port 702, or is not collected by sensors in telematic device 704. The at least one sensor 792 could include, as non-limiting examples, a speed sensor, an inertial sensor, an ambient temperature sensor, a location sensor, an image sensor (e.g. camera), and any other appropriate sensors which collect vehicle-related data.

Optionally, peripheral device 790 can also include at least one processor 794 and at least one processor 796. Peripheral device 790 can thus be used to performs acts of the methods discussed herein (by the at least one processor 792 executing processor-executable instructions stored at the at least one non-transitory processor-readable storage medium 796).

Communication interface 712 (and port 702), sensors 714, and communication interface 716 (and sensor 792) show multiple means by which telematics device 704 can collect sensor data. However, each of these components is not necessarily required. For example, any of communication interface 712, sensors 714, or communication interface 716 can be omitted, as long as one means of collecting sensor data remains.

Telematic device 704 (optionally in combination with peripheral device 790) can be implemented, for example, as any of vehicle devices 122 in FIG. 1. Telematic device 704 (optionally in combination with peripheral device 790) can also be used in the context of any of the methods discussed herein (in particular, method 200 in Figure and/or method 400 in FIG. 4).

As an example with reference to method 200 in FIG. 2, acts 202, 204, 206, 208, and 210 of method 200 can be performed by the at least one processor 722, by executing processor-executable instructions stored at non-transitory processor-readable storage medium 724. Further, prior to method 200, the telematic monitoring device can collect the trip data by collecting sensor data. In some implementations, collecting the sensor data comprises collecting the sensor data from at least one sensor external to the telematic device 704 (e.g. from at least one vehicle sensor, via port 702 and communication interface 712; or from at least one sensor 792 of peripheral device 790, by communication interface 716). In some implementations, collecting the sensor data comprises collecting the sensor data from at least one sensor included in the telematic device 704 (e.g. at least one of sensors 714). In some implementations, collecting the sensor data comprises collecting the sensor data from at least one sensor external to the telematic device 704, and from at least one sensor included in the telematic device 704.

Figure 8:
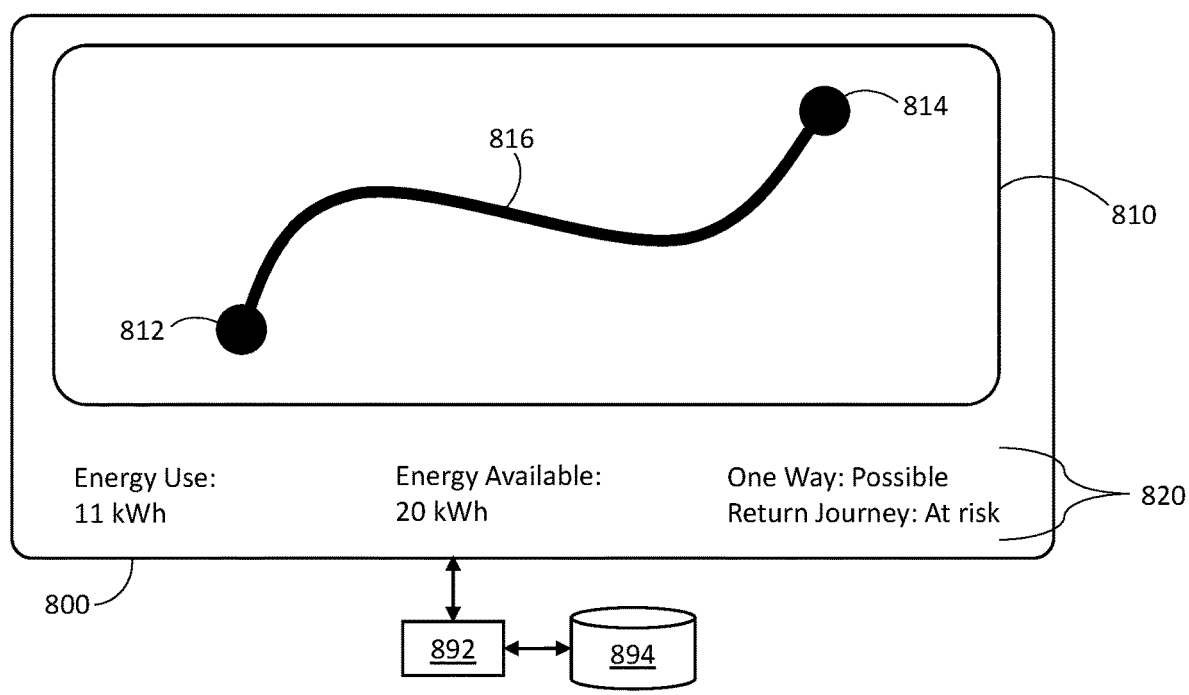
FIG. 8 is a schematic diagram of an exemplary display.

FIG. 8 is a schematic diagram which illustrates an exemplary display 800. Display 800 presents a graphical user interface displayed to a user, which shows a map area 810 and energy information area 820. The interface areas illustrated in FIG. 8 are exemplary, and interfaces areas could be removed, shifted, reorganized, or added as appropriate for a given application. Further, interface areas do not need to be permanent. For example, display 800 can be a general-purpose display, where the content and areas displayed change depending on use. In some implementations, display 800 is part of an entertainment display, navigation display, information display, "infotainment" display, tablet, smartphone, PDA, or any other appropriate device positioned at a vehicle. The device can be permanently affixed at the vehicle (e.g. built in, or permanently mounted as an aftermarket component), or can be a portable device removable from the vehicle (e.g. a device carried by a driver of the vehicle).

FIG. 8 also shows at least one processor 892 and at least one non-transitory processor-readable storage medium 894 communicatively coupled to display 800. In some implementations, display 800, processor 892, and non-transitory processor-readable storage medium 894 are packaged as a single device (e.g. a navigation device, a smartphone, an infotainment device, etc.). In other implementations, display 800, processor 892, and non-transitory processor-readable storage medium 894 can be packaged separately (e.g. display 800 could display content as instructed by a processor of another device, such as a telematics device, an onboard vehicle computer, etc.).

The elements of FIG. 8 can be used in the context of the methods described herein. With reference to method 200 in FIG. 2, the trip data can be generated based on simulation. In the example if FIG. 8, a trip is simulated between origin 812 and destination 814, shown according to route 816. The origin 812 and destination 814 could be input by a user, or could be automatically retrieved as appropriate. For example, origin 812 could be retrieved as corresponding to a present location of a vehicle as indicated in location data from a location sensor of the vehicle. As another example, destination 814 could be automatically retrieved based on a driver history or schedule (e.g. the destination can be set as the driver's home when a present time is close to a time the driver normally heads home, or the destination 814 could be retrieved from a delivery scheduling service indicating a next stop for the driver, as non-limiting examples). Note that while display 800 shows a visualization of a simulated trip, such visualization is not necessary. A trip can be simulated without outputting said simulation to a vehicle driver (e.g. simulating a trip or plurality of trips of a vehicle based on a travel schedule for the vehicle).

The trip between origin 812 and destination 814 is simulated (e.g. by the at least one processor 892), and trip data is generated for the simulated trip. For example, a sequence of geographic positions can be generated representing route 816. As another example, timestamps can be generated for the trip based on expected speed of the vehicle over the trip (e.g. based on speed limit data, weather data, or any other appropriate data). As yet another example, ambient temperature of the environment can generated, for example by retrieving temperature data from a weather database. As yet another example, speed data can be generated (e.g. based on speed limit data, historical traffic data, or any other appropriate type of data).

Based on the generated trip data, method 200 can be performed, thereby providing an estimated energy consumption by the vehicle for the trip. This estimated energy consumption is presented to the user via display 800 in Energy information area 820 (11 kWh, in the illustrated example). Display 800 also shows an amount of energy available in the vehicle battery in Energy information area 820 (20 kWh in the illustrated example). Amount of energy available could be identified based on a state of charge indication from the vehicle (e.g. received over port 702), or by determining battery level based on a measured voltage of the battery, as non-limiting examples.

In the illustrated example, feasibility of the trip is also indicated in Energy information area 820 (One way: Possible, in the illustrated example). Feasibility can be determined by comparing the estimated energy consumption for the trip to energy available. When the estimated energy consumption is less than available energy, the trip should be possible. However, a safety threshold could also be considered, where the available energy should exceed the estimated energy consumption by a certain amount in order for the trip to definitively be indicated as possible, in the event that the estimated energy consumption is below an actual energy consumption for the trip.

In the illustrated example, feasibility of a return trip is also indicated in Energy information area 820 (Return Journey: At Risk, in the illustrated example). In some implementations, feasibility of the return journey is evaluated by assuming the same energy consumption of the trip as previously estimated. In other implementations, the return journey can be separately simulated to generate trip data (similar to as performed for the outgoing journey), and estimated energy consumption determined in accordance with method 200. Such an implementation will typically be more accurate, as differences between the outgoing journey and the return journey can be accounted for (e.g. different levels of traffic, different weather, different amounts of road incline).

Display of possibility of the return journey is not always relevant, and is thus an optional feature in the exemplary implementation. As and example, a vehicle does not always need to make a return journey along the same route. As another example, a charge station may be available for the vehicle to replenish energy at the destination.

The exemplary implementation discussed with reference to FIG. 8 is merely exemplary, and achieves similar objectives to those of method 400 in FIG. 4. In this regard, description of method 400 is applicable to FIG. 8 unless context dictates otherwise, and likewise description of FIG. 8 is applicable to method 400 unless context dictates otherwise.

In some implementations, the energy consumption as determined in act 210 of method 200 is output to a management device. In an example, with reference to FIG. 1, a vehicle device 122 determines energy consumption for a trip, then outputs the determined energy consumption to management device 110. In this example, management device 110 manages a plurality of vehicles which operate out of a particular location, lot, or warehouse. The management device receives estimated energy consumption for at least one upcoming trip for each vehicle of a plurality of vehicles, as well as state of charge data (data indicating level of charge) for the plurality of vehicles. Based on estimated energy consumption for the at least one trip, charging of the plurality of vehicles (by a limited number of charge stations) can be prioritized so that each vehicle has sufficient energy to complete it's upcoming at least one trip.

In some implementations similar to the above implementation, the management device estimates energy consumption for at least one upcoming trip for a plurality of vehicles managed by the management device (instead of receiving estimated energy consumption as determined by vehicle devices at the vehicles). The management device receives state of charge data (data indicating level of charge) for the plurality of vehicles. Based on estimated energy consumption for the at least one trip, charging of the plurality of vehicles (by a limited number of charge stations) can be prioritized so that each vehicle has sufficient energy to complete its upcoming at least one trip.

In an illustrative example (applicable in the two preceding implementations), a fleet of vehicles operates during the day, and returns to a depot at night for charging. Energy consumption for each vehicle for the next day (i.e. energy consumption for at least one trip expected to be performed by the vehicle the next day) is estimated in accordance with method 200 (either by vehicles devices 122 or by management device 110). Vehicles with a state of charge furthest from a needed energy the next day are prioritized for charging. Once charged (either to full charge or to a sufficient charge for the next day), these vehicles can be jockeyed so that other vehicles can charge (i.e. the vehicle coupled to a charge station is swapped).

In the above implementations and examples, management device 110 is described as managing the vehicles. However, in alternative implementations, device 130 can manage vehicles in a similar way. Further, the management devices are not limited to managing a single location, but can manage a fleet of vehicles across multiple locations.

In some implementations, energy consumption for historical trips by at least one vehicle can be estimated in accordance with method 200, even if the at least one vehicle is not an electric or battery-powered vehicle (similarly to as discussed earlier). For example, energy consumption for historical trips by at least one vehicle can be estimated in accordance with method 200 (e.g. by a management device such as device 110 or device 130 in FIG. 1), to evaluate feasibility of implementing electric or battery-powered vehicles in place of the existing at least one vehicle. In an example, estimated energy consumption by the at least one vehicle can be compared to energy capacities of battery-powered vehicles available for purchase. Estimated energy consumption for a trip (or an accumulation of estimated energy consumption over a plurality of trips), between rest periods where the vehicle can charge, can be compared to amount of energy replenishable to the vehicle during charge periods. If sufficient energy is replenishable during rest periods where the vehicle can charge, such that the vehicle is able to perform the trip (or plurality of trips) for which energy consumption is estimated, the vehicle is deemed suitable for replacement by a battery-powered vehicle. Determination of suitability for vehicles as battery-powered vehicles is described in U.S. Provisional Patent Application No. 63/389,560 and U.S. Non-Provisional patent application Ser. No. 17/981,614, the entirety of which are incorporated by reference herein.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processor can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of

What is claimed is:

1. A method for estimating energy consumption by a vehicle for a trip by the vehicle, based on trip data representative of the trip, the method comprising:
   identifying a distance of travel for the trip based on a plurality of geographic positions represented in the trip data;
   identifying a duration of the trip based on a plurality of timestamps in the trip data;
   identifying an ambient temperature of an environment of the vehicle for the trip based on temperature data;
   identifying speed of the vehicle for the trip based on the trip data;
   identify acceleration of the vehicle for the trip based on the trip data;
   determining energy consumption by the vehicle for the trip as a weighted sum of:
      energy loss due to vehicle friction, based on the identified distance of travel;
      a total time of the trip, based on the identified duration of the trip;
      energy loss due to temperature control of the vehicle, based on a difference between the identified ambient temperature of the vehicle and an optimal temperature, for the duration of the trip;
      energy loss due to air resistance, based on the identified speed of the vehicle; and
      energy loss due to imparting kinetic energy to the vehicle which is not recovered by a regenerative braking system of the vehicle, based on only positive acceleration of the vehicle during the trip; and
   outputting the determined energy consumption by the vehicle for the trip.

2. The method of claim 1, wherein identifying the distance of travel comprises:
   determining respective distances between sequential geographic positions represented in the trip data;
   summing each of the determined respective distances.

3. The method of claim 1, wherein identifying a duration of the trip comprises determining a difference between a first timestamp corresponding to a beginning of the trip and a second timestamp corresponding to an end of the trip.

4. The method of claim 1, wherein:
   the temperature data is separate from the trip data; and
   identifying an ambient temperature of an environment of the vehicle comprises identifying, from the temperature data, ambient temperature during the trip for a geographical region corresponding to a geographical region where the trip occurred.

5. The method of claim 1, wherein:
   the temperature data is included in the trip data, and the temperature data includes a plurality of indications of temperature of an environment of the vehicle during the trip;
   the method further comprises determining an average ambient temperature of an environment of the vehicle over the trip, by averaging temperature indicated in the plurality of indications of temperature of an environment of the vehicle during the trip; and
   energy loss due to temperature control of the vehicle is based on a difference between the determined average ambient temperature and an optimal temperature, for the duration of the trip.

6. The method of claim 1, wherein:
   the temperature data is included in the trip data, and the temperature data includes a plurality of indications of temperature of an environment of the vehicle during the trip; and
   energy loss due to temperature control of the vehicle is based on a respective difference between each indication of ambient temperature of the vehicle and an optimal temperature, over the duration of the trip.

7. The method of claim 1, wherein:
   identifying a speed of the vehicle comprises identifying speed of the vehicle for a plurality of segments of the trip; and
   energy loss due to air resistance for the trip is determined as a summation of energy loss due to air resistance for each segment of the trip, based on the identified speed of the vehicle for each segment of the trip.

8. The method of claim 7, wherein identifying speed of the vehicle for a plurality of segments of the trip comprises:
   identifying each segment of the trip as being between sequential geographic positions indicated in the trip data with corresponding timestamps; and
   identifying speed of the vehicle for each segment of the trip by determining, for each segment of the trip, distance of the segment as distance between sequential geographic positions corresponding to the respective segment, duration of the segment as difference in time between timestamps corresponding to a beginning of the segment and an end of the segment, and dividing the respective distance by the respective duration for the segment.

9. The method of claim 1, wherein loss due to imparting kinetic energy to the vehicle which is not recovered by a regenerative braking system of the vehicle is determined by integrating only positive acceleration of the vehicle during the trip.

10. The method of claim 1, further comprising:
    collecting, by a telematic monitoring device positioned at the vehicle, the trip data.

11. The method of claim 1, further comprising:
    simulating the trip by the vehicle; and
    generating the trip data based on the trip as simulated.

12. The method of claim 1, wherein outputting the determined energy consumption by the vehicle for the trip comprises presenting the determined energy consumption by the vehicle for the trip to a user of the vehicle by a user interface positioned at the vehicle.

13. The method of claim 1, wherein outputting the determined energy consumption by the vehicle for the trip comprises presenting the determined energy consumption by the vehicle for the trip to a manager of the vehicle by a vehicle management device external to the vehicle.

14. The method of claim 12, further comprising outputting, by the user interface, an indication of feasibility for the trip based on the determined energy consumption by the vehicle for the trip and energy available in a battery of the vehicle.

15. The method of claim 1, further comprising receiving, by at least one sensor communication interface, sensor data from at least one sensor, wherein the trip data includes the sensor data received by the at least one sensor interface.

16. The method of claim 1, further comprising capturing, by at least one sensor, sensor data, wherein the trip data includes the sensor data captured by the at least one sensor.

* * * * *